United States Patent [19]

Sheldon et al.

[11] Patent Number: 5,536,283
[45] Date of Patent: Jul. 16, 1996

[54] ALUMINA ABRASIVE WHEEL WITH IMPROVED CORNER HOLDING

[75] Inventors: David A. Sheldon, Millbury; Robert S. Lundberg, Charlton City, both of Mass.

[73] Assignee: Norton Company, Worcester, Mass.

[21] Appl. No.: 448,927

[22] Filed: May 25, 1995

Related U.S. Application Data

[63] Continuation-in-part of Ser. No. 278,529, Jul. 20, 1994, which is a continuation-in-part of Ser. No. 100,519, Jul. 30, 1993, Pat. No. 5,401,284.

[51] Int. Cl.$^6$ .................................................. B24D 3/02
[52] U.S. Cl. .................................................. 51/308; 51/309
[58] Field of Search .................... 51/308, 309; 501/12, 501/66, 68

[56] References Cited

U.S. PATENT DOCUMENTS

| | | | |
|---|---|---|---|
| 3,892,581 | 7/1975 | Burgman et al. | 501/66 |
| 4,259,118 | 3/1981 | Sack | 501/66 |
| 4,623,364 | 11/1986 | Cottringer et al. | 51/309 |
| 4,744,802 | 5/1988 | Schwabel | 51/309 |
| 4,792,535 | 12/1988 | Fine | 501/66 |
| 4,797,269 | 1/1989 | Bauer et al. | 423/600 |
| 4,881,951 | 11/1989 | Wood et al. | 51/309 |
| 4,898,597 | 2/1990 | Hay et al. | 51/309 |
| 4,925,814 | 5/1990 | Fine | 501/66 |
| 4,998,384 | 3/1991 | Bouchard et al. | 51/168 |
| 5,009,676 | 4/1991 | Rue et al. | 51/309 |
| 5,035,723 | 7/1991 | Kalinowski et al. | 51/307 |
| 5,035,724 | 7/1991 | Pukari et al. | 501/12 |
| 5,064,784 | 11/1991 | Saito et al. | 501/66 |
| 5,090,970 | 2/1992 | Rue et al. | 51/309 |
| 5,118,326 | 6/1992 | Lee et al. | 51/309 |
| 5,129,919 | 7/1992 | Kalinowski et al. | 51/309 |
| 5,131,923 | 7/1992 | Markhoff-Matheny | 51/293 |
| 5,139,978 | 8/1992 | Wood | 501/127 |
| 5,147,829 | 9/1992 | Hench et al. | 501/12 |
| 5,152,810 | 10/1992 | Rue et al. | 51/309 |
| 5,203,886 | 4/1993 | Sheldon et al. | 51/309 |
| 5,236,483 | 10/1993 | Miyashita et al. | 501/12 |
| 5,268,335 | 12/1993 | Kerko et al. | 501/66 |
| 5,401,284 | 3/1995 | Sheldon et al. | 51/308 |

*Primary Examiner*—Deborah Jones
*Attorney, Agent, or Firm*—Mary E. Porter

[57] ABSTRACT

The present invention provides a vitreous-bonded abrasive grinding wheel wherein the abrasive grit portion comprises an alumina abrasive and wherein the wheel has improved corner or form holding characteristics and mechanical properties. The invention further includes the bond composition which allows for improved corner or form holding and mechanical properties with alumina abrasives.

6 Claims, 2 Drawing Sheets

ALUMINA ABRASIVE WHEEL WITH IMPROVED CORNER HOLDING

CROSS REFERENCE TO RELATED APPLICATIONS

This is a continuation in part of copending application Ser. No. 08/278,529 filed Jul. 20, 1994, which is a continuation in part of Ser. No. 08/100,519, filed Jul. 30, 1993, now U.S. Pat. No. 5,401,284.

This application is related to U.S. Pat. No. 5,035,723 issued Jul. 30th, 1991 and U.S. Pat. No. 5,203,886 issued Apr. 20th, 1993, the entire specifications of which are incorporated herein by reference.

BACKGROUND OF THE INVENTION

1. Field of the Invention

The invention relates to abrasive wheels particularly abrasive wheels containing alumina abrasive grit with improved corner holding properties. The invention further includes a bond composition which allows for improved mechanical strength and improved corner holding properties.

2. Technology Review

Precision moving parts are being designed to run at higher outputs, higher efficiencies and longer service. These parts are for example engines (internal combustion, jet & electric), drive trains (transmissions & differentials), and bearing surfaces. In order to meet these demands, the parts must be produced with improved quality including better/stronger designs with tighter dimensional tolerances. To achieve these tolerances, the parts are being produced with better quality materials to near net or final shape and size.

Grinding wheels are often utilized for fabrication of the entire part or to impart the final dimensions. Vitreous or glass bonded grinding wheels are the wheels utilized most on metal parts. In order to produce these types of precision parts with a grinding wheel, the reverse image of the part is "dressed" into the wheel face with a diamond tool. Because the part being manufactured takes the profile of the grinding wheel, it is important that the grinding wheel retain that shape as long as possible. The ideal situation would then be to produce the precision parts with exact dimensional tolerances and with no material damage.

Typically, the grinding wheels fall out of shape or fail at a corner or a curve in the wheel. Standard fused alumina abrasive products may last through the grinding of two or three pieces before a significant change occurs in the corner of the wheel. Hence, the operators of the grinding machines may set up dressing of the wheel after every piece to avoid defects. With wheels produced using higher performing sol-gel alumina abrasive grits, the shape change in the corner of the wheel may not appear until after grinding four or five pieces and the operators of the grinding machines may plan on dressing these wheels after grinding three pieces. While the dressing frequency reduction characteristic of sol-gel alumina wheels is an improvement over standard abrasive wheels, a reduction in the loss of the alumina wheel through dressing and further gains in dressing frequency reduction are desirable goals for conventional alumina abrasive wheels.

What is needed is a better corner or form holding alumina wheel so that the dressing interval can be extended. It is therefore an object of this invention to produce an alumina abrasive grit wheel with improved corner or form holding.

It is further an object of this invention to produce a bond which can be used with an alumina abrasive grit wheel to improve corner or form holding.

SUMMARY OF THE INVENTION

The present invention provides a vitreous-bonded abrasive grinding wheel wherein the abrasive grit portion comprises a fused aluminum oxide ("alumina") abrasive and wherein the wheel has improved corner or form holding characteristics and mechanical properties. The invention further includes a bond composition which allows for improved corner or form holding and mechanical properties in vitreous bonded wheels comprising alumina abrasives.

DETAILED DESCRIPTION OF THE INVENTION

Figure 1:
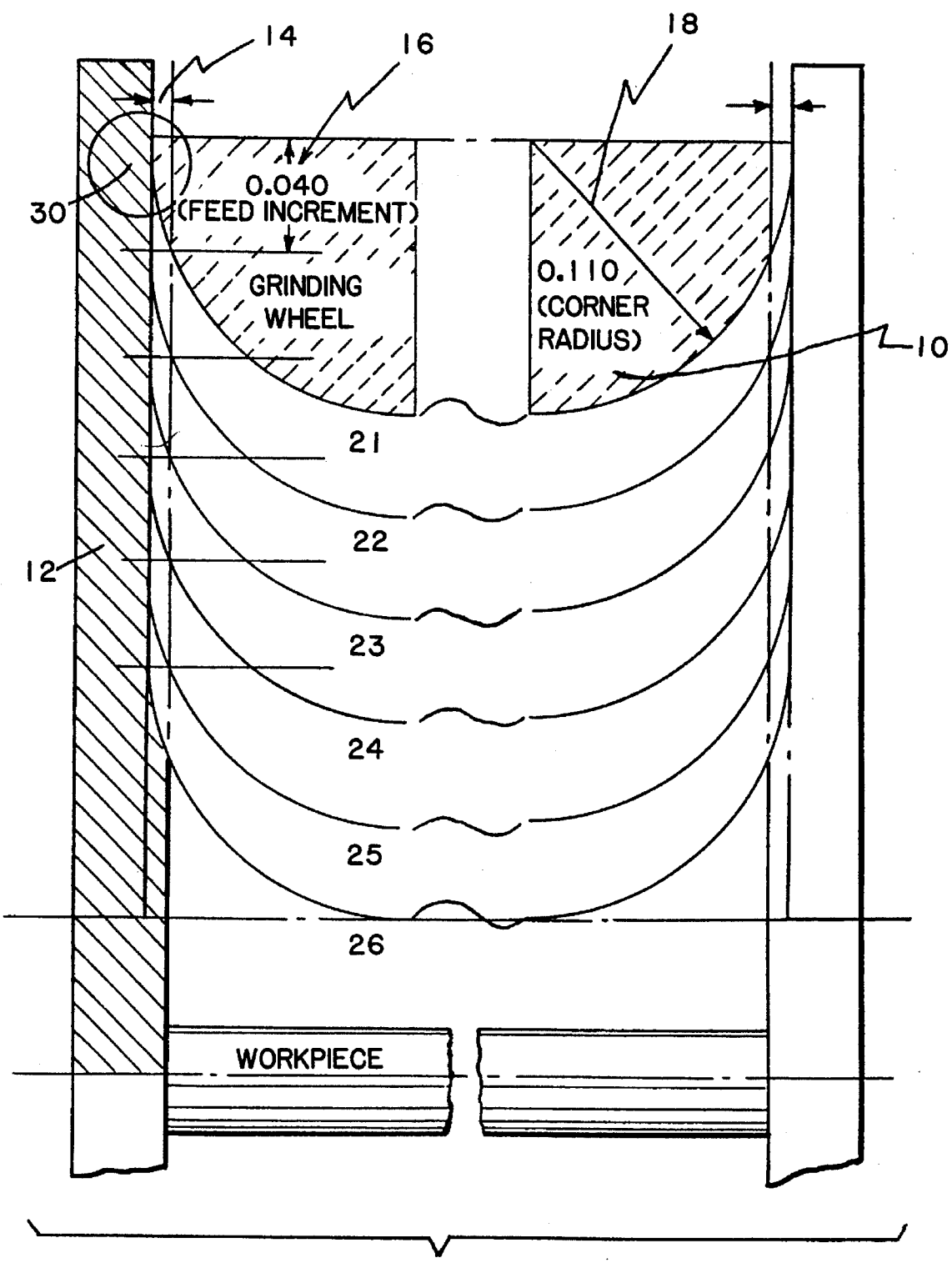
FIG. 1. Schematic illustrating corner grinding with a grinding wheel of a workpiece in a corner holding test.

The vitrified bonded abrasive bodies of the present invention comprise alumina grits. Alumina grits are well known in the art. Also well known and suitable for use herein are sol-gel aluminous grits.

Sol-gel aluminous grits can be seeded or unseeded. What is meant by sol-gel aluminas are aluminas made by a process comprising peptizing a sol of an aluminum oxide monohydrate so as to form a gel, which is then dried and fired to form alpha alumina.

The initial sol may further include up to 15% by weight of spinel, mullite, manganese dioxide, titania, magnesia, rare earth metal oxides, zirconia powder or a zirconia precursor (which can be added in larger amounts, e.g. 40 wt % or more), or other compatible additives or precursors thereof. These additives are often included to modify such properties as fracture toughness, hardness, friability, fracture mechanics, or drying behavior.

Once the gel has formed, it may be shaped by any convenient method such as pressing, molding or extrusion and then carefully dried to produce an uncracked body of the desired shape.

The gel can be shaped and cut into suitable sizes for firing or simply spread out to any convenient shape and dried, typically at a temperature below the frothing temperature of the gel. Any of several dewatering methods, including solvent extraction, can be used to remove the free water of the gel to form a solid.

After the solid is dried, it can be cut or machined to form a desired shape or crushed or broken by any suitable means, such as a hammer or ball mill, to form particles or grains. Any method for comminuting the solid can be used.

After shaping, the dried gel can then be calcined to remove essentially all volatiles and transform the various components of the grains into ceramics (metal oxides). The dried gel is generally heated until the free water and most of the bound water is removed. The calcined material is then sintered by heating and is held within a suitable temperature range until substantially all of the alpha alumina monohydrate is converted to alpha alumina.

As mentioned earlier the sol-gel alumina may either be seeded or unseeded. With seeded sol-gel aluminas, nucleation sites are deliberately introduced into or created in situ in the aluminum oxide monohydrate dispersion. The presence of the nucleating sites in the dispersion lowers the temperature at which alpha alumina is formed and produces an extremely fine crystalline structure.

Suitable seeds are well known in the art. Generally they have a crystal structure and lattice parameters as close as possible to those of alpha alumina. Seeds that may be used include for example particulate alpha alumina, alpha ferric oxide ($Fe_2O_3$), precursors of alpha alumina or alpha ferric oxide which convert respectively to alpha alumina or alpha ferric oxide at a temperature below the temperature at which alumina monohydrate would transform to alpha alumina. These seeds types are, however, given as illustration and not as a limitation. The seed particles to be effective should preferably be submicron in size.

Preferably, if a seeded sol-gel alumina is used the amount of seed material should not exceed about 10 weight % of the hydrated alumina and there is normally no benefit to amounts in excess of about 5 weight %. If the seed is adequately fine (preferably about 60 $m^2$ per gram or more), preferably amounts of from about 0.5 to 10 weight % may be used with from about 1 to 5 weight % being more preferred. The seeds may also be added in the form of a precursor which converts to the active seed form at a temperature below that at which alpha alumina is formed.

Unseeded sol-gel alumina abrasive may also be used in some cases. This abrasive can be made by the same process described above except for the introduction of seed particles, sufficient rare earth metal oxides or their precursors may be added to the sol or gel to provide at least about 0.5% by weight and preferably about 1 to 30% by weight rare earth metal oxide after firing.

The abrasive wheels of the present invention are comprised of alumina abrasive grits and optionally one or more secondary abrasives. Abrasive wheels include abrasive, bond, porosity and possibly other fillers and additives. The amounts of abrasive used in the wheel which may include a secondary abrasive may vary widely. The composition of the abrasive wheel of the invention preferably contains from about 34 to about 56 volume % of abrasive, more preferably contains from about 40 to about 54 volume % of abrasive, and most preferably contains from about 44 to about 52 volume % of abrasive.

The aluminous abrasive preferably provides from about 5 to about 100 volume % of the total abrasive in the wheel and more preferably from about 30 to about 70 volume % of the total abrasive in the wheel.

Secondary abrasive(s) preferably provide from about 0 to about 95 volume % of the total abrasive in the wheel and more preferably from about 30 to about 70 volume % of the total abrasive in the wheel. The secondary abrasives which may be used include for example, silicon carbide, cubic boron nitride, diamond, flint, garnet and bubble alumina. These examples of secondary abrasives are, however, given as an illustration and not as a limitation.

The composition of the abrasive wheel usually contains porosity. The composition of the abrasive wheel of the invention preferably contains from about 0 to about 68 volume porosity, more preferably contains from about 28 to about 56 volume % porosity, and most preferably contains from about 30 to about 53 volume % porosity. The porosity is formed by both the natural spacing provided by the natural packing density of the materials and by conventional pore inducing media such as for example hollow glass beads, ground walnut shells, beads of plastic material or organic compounds, foamed glass particles and bubble alumina. These examples of pore inducers are, however, given as an illustration and not as a limitation.

The abrasive wheels of the present invention are bonded with a vitreous bond. The vitreous bond used contributes significantly to the improved corner or form holding characteristics of the abrasive wheels of the present invention. The raw materials for the bond preferably include Kentucky Ball Clay No. 6, nepheline, sodium silicate powder, lithium carbonate, flint, wollastonite, and cobalt spinel. These materials in combination contain the following oxides: $SiO_2$, $Al_2O_3$, $Fe_2O_3$, $TiO_2$, CaO, MgO, $Na_2O$, $K_2O$, $Li_2O$, $B_2O_3$, and CoO. The composition of the abrasive wheel preferably contains from about 3 to about 25 volume % bond, more preferably contains from about 4 to about 20 volume % bond, and most preferably contains from about 5 to about 18.5 volume % bond.

The bond after firing contains greater than about 47 weight % $SiO_2$, preferably from about 52 to about 62 weight % $SiO_2$, more preferably from about 54 to about 60 weight % $SiO_2$, and most preferably about 57 weight % $SiO_2$; less than about 16 weight % $Al_2O_3$, preferably from about 12 to about 16 weight % $Al_2O_3$, more preferably from about 13 to about 15 weight % $Al_2O_3$, and most preferably about 14.4 weight % $Al_2O_3$; preferably from about 7 to about 11 weight % $Na_2O$, more preferably from about 8 to about 10 weight % $Na_2O$, and most preferably about 8.9 weight % $Na_2O$; less than about 2.5 weight % $K_2O$, preferably from about 0.05 to about 2.5 weight % $K_2O$, more preferably from about 1 to about 2 weight % $K_2O$, and most preferably about 1.6 weight % $K_2O$; greater than about 2.0 weight % $Li_2O$, preferably from about 2.0 to about 10.0 weight % $Li_2O$, preferably from about 2.0 to about 3.4 weight % $Li_2O$, more preferably from about 2.0 to about 2.7 weight % $Li_2O$, and most preferably about 2.2 weight % $Li_2O$; less than about 18 weight % $B_2O_3$, preferably from about 9 to about 16 weight % $B_2O_3$, more preferably from about 11 to about 14 weight % $B_2O_3$, and most preferably about 12.6 weight % $B_2O_3$; preferably from about 0 to about 2 weight % CoO, more preferably from about 0.5 to about 1.3 weight % CoO, and most preferably about 0.9 weight % CoO. Cobalt oxide (Coo) is not necessary for the invention as is included as a coloring agent only. The other oxides which are in the vitreous bond such as $Fe_2O_3$, $TiO_2$, CaO, and MgO are impurities in the raw materials which are not essential in making the bond. The bond also provides increased mechanical strength with abrasive wheels made with sol-gel or fused alumina abrasives.

The abrasive wheels are fired by methods known to those skilled in the art. The firing conditions are primarily determined by the actual bond and abrasives used. The vitrified bonded body further may also be impregnated in a conventional manner with a grinding aid, such as sulfur, or with a vehicle, such as epoxy resin, to carry a grinding aid into the pores of the wheel.

The resulting abrasive wheels unexpectedly have improved corner or form holding properties which can be measured both quantitatively and qualitatively. While the change in shape of the corner of an abrasive wheel has been considered to be the failure criteria for abrasive wheels, this is not a quantitative test because the change in shape can only be observed under a microscope and qualitatively be felt by a finger nail or a pencil tip. A test has therefore been developed for defining and quantifying wheel corner failure modes.

This test measures both the "radial wear" and "wear area" at a set infeed rate. In further defining the test under which the grinding wheels were tested and establishing a standard by which similar grinding wheels can be measured, the conditions of the testing are as follows:

Grinding Machine: Bryant Lectraline™ LL3 I.D./O.D., 10 horsepower grinder

Wet Grinding: 5–7% Trim MasterChemical™ VHP $E_{200}$ with water

Workpiece Material Ground: 4330V crankshaft steel, $R_c$ 28 to 32

Workpiece Part size: 4 inch outer diameter

Width of Grind From the Corner of the Workpiece: 0.009 inches

Corner Radius of Grinding Wheel: 0.110 inches

Part Speed: 200 sfpm

Infeed Rate into Part: 0.0133 inches/second

Wheel Face Dressed: rotary diamond roll (RPC 2993) at 4600 rpm at dress rate of 0.002 inches/second to achieve the 0.110 radius Wheel Speed: 12,000 sfpm Number of Grinds per Test: up to 12

Infeed per Grind: 0.04 inches

Figure 2:
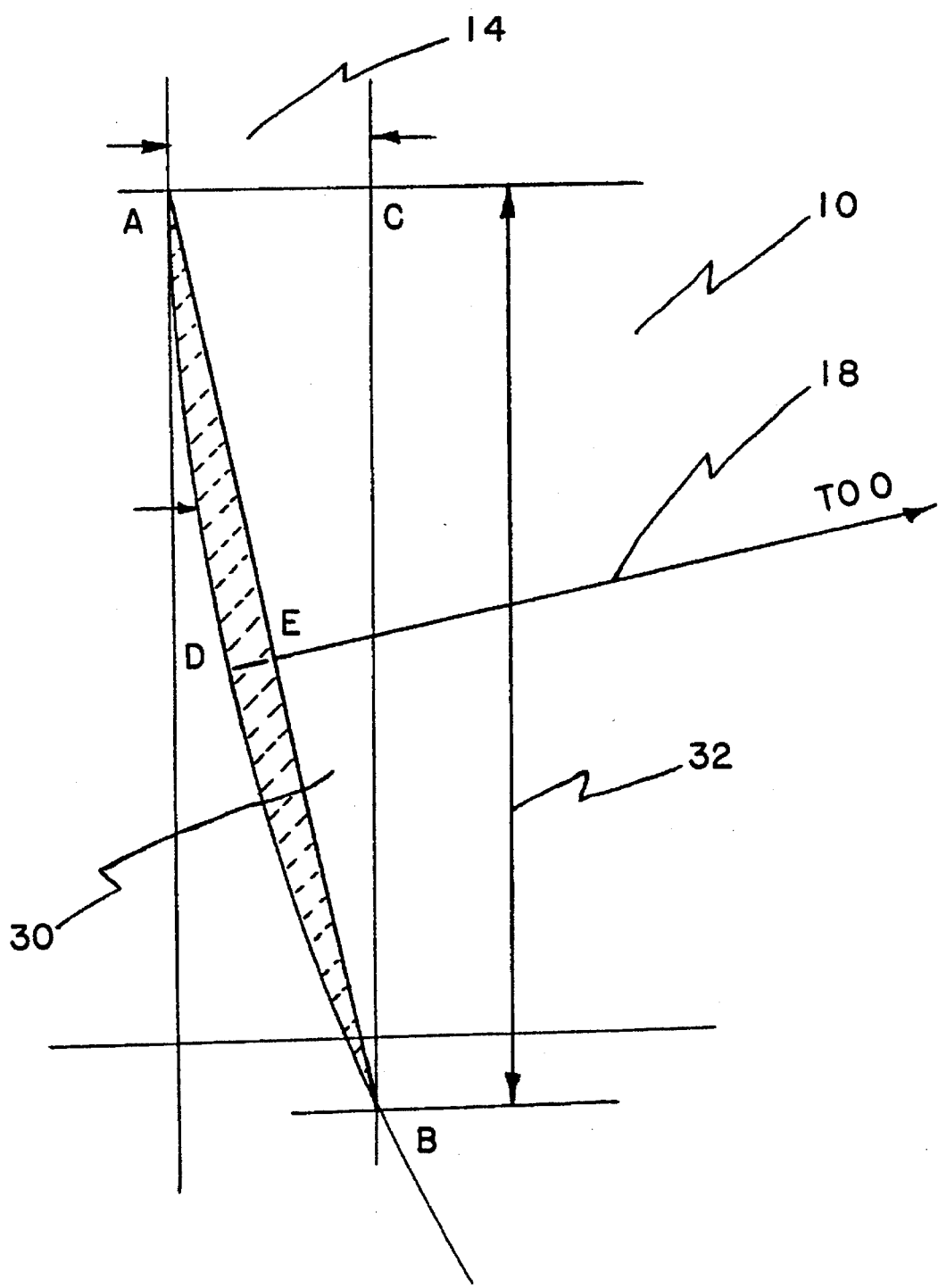
FIG. 2. Schematic illustrating that portion of the corner radius of a grinding wheel in contact with the surface of the workpiece in a corner holding test.

The corner holding test is designed to measure the degree to which the corner of a grinding wheel holds its shape during a grinding operation. Shape holding is measured by two quantities, "radial wear" and "wear area" FIG. 1 is a schematic of corner grinding with a grinding wheel 10 of a workpiece 12 such as for example a crankshaft. Where 21–26 represents the incremental progession of the grinding wheel through the workpiece, 21–22 represents 1 grind. The width of the grind 14 from the corner of the workpiece is 0.009. The infeed 16 is 0.04 inches per grind. The corner radius 18 of the grinding wheel 10 is 0.110 inches. FIG. 2 illustrates that portion of the corner radius 30 of a grinding wheel 10 in contact with the surface of the workpiece 12 in the corner holding test. The width of the grind 14, the horizontal distance between A and C in FIG. 1, is the thickness of metal to be removed from the test workpiece material. The height of contact 32, the verticle distance between A and B in FIG. 2, is the height of that portion of the grinding wheel which is in contact with the test workpiece material at the end of one grinding pass. To quantify corner holding two measurements are made under the grinding conditions specified above. These two measurements are "wear area" and "radial wear".

The wear area is a measurement of the change in the area of the profile of the corner of the grinding wheel after grinding of the workpiece. The wear area is illustrated in FIG. 2 by the area confined by AEBDA for a given height of contact 32, corner radius 18, and width of cut 14. The radial wear is a measurement of the maximum change in the corner radius 18 between points A and B. The measurement is illustrated in FIG. 2, the radial wear being equal to DE where point E is the maximum change in the corner radius between points A and B for a height of contact 32. The wear area and radial wear are measured by grinding a tile coupon after each grind to obtain the profile of the wheel. Coupons are traced on an optical comparator with a magnification of 50X. Wear area from the trace is measured with a planemeter and radial wear from the trace is measured as the maximum radial wear with a caliper.

Data is presented in the Examples quantitatively showing an improved corner holding of alumina and sol-gel alumina abrasive wheels by the way of demonstrating the unexpected increased number of grinds the new wheels can undergo before reaching radial wear and wear area comparable to that of standard alumina and sol-gel alumina abrasive wheels.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1

Samples were made for testing and comparing the modulus of rupture of the new bond with Norton's standard commercial bond for use with seeded sol-gel abrasives. The new bond had a prefired composition of 30.3 wt % of powdered glass frit (the frit with a composition of 41.2 wt % $SiO_2$, 39.9 wt % $B_2O_3$, 5.1 wt % $Al_2O_3$, 10.3 wt % $Na_2O$, 1.3 wt % $Li_2O$, 2.1 wt % MgO/CaO, and trace amounts of $K_2O$), 27.7 wt % nephelene syenite, 20 wt % Kentucky No. 6 Ball Clay, 10 wt % sodium silicate powder, 4.7 wt % flint (quartz), 4.3 wt % lithium carbonate, 1 wt % wollastonite and 2 wt % pure cobalt aluminate spinel. The chemical compositions of nephelene syenite, Kentucky No. 6 Ball Clay, sodium silicate, flint, lithium carbonate and wollastonite are given in Table I.

TABLE I

| Oxide (wt %) | Nephelene Syenite | Kentucky #6 Ball Clay | Sodium Silicate | Flint | Lithium Carbonate | Wollastonite |
| --- | --- | --- | --- | --- | --- | --- |
| $SiO_2$ | 60.2 | 64.0 | 76.2 | 99.6 | | 50.9 |
| $Al_2O_3$ | 23.2 | 23.2 | | 0.2 | | 0.3 |
| $Na_2O$ | 10.6 | 0.2 | 23.8 | | 0.2 | |
| $K_2O$ | 5.1 | 0.4 | | | | |
| $Li_2O$ | | | | | 40.1 | |
| MgO | | 0.3 | | | | 0.1 |
| CaO | 0.3 | 0.1 | | | | 46.9 |
| Impurities | 0.1 | 3.4 | | 0.1 | 0.1 | 0.9 |
| Loss on Ignition | 0.4 | 8.7 | | 0.1 | 59.6 | 0.9 |

The bond was produced by dry blending the raw materials in a Sweco Vibratory Mill for 3 hours. The bond was mixed with 60 grit abrasive consisting of a 1 to 1 blend of seeded sol-gel alumina with high purity fused white aluminum oxide abrasive. This was further mixed with a powdered dextrin binder, liquid animal glue and 0.1% ethylene glycol as a humectant in a Hobart N-50 dough mixer (capacity of 2 kg. of mix) at low speed. The mix was screened through a 14 mesh screen to break-up any lumps. The mix was then pressed into bars with dimensions of 4"×1"×½" in a three cavity bar mold setup. The bars were fired under the following conditions at 40° C. per hour from room temperature to 1000° C. held for 8 hours at that temperature then cooled to room temperature in a periodic kiln. Sample bars were also made with Norton's standard commercial bond using the procedure listed above.

The bars were tested un-notched on a Instron Model 4204 mechanical testing machine with a 4-point bending jig with a support span of 3" a load span of 1" and at a loading rate of 0.050" per minute cross head speed. Samples were run with the fired bond content ranging from 10 weight % to 30 weight of the abrasive bars. The results are shown in Table II and FIG. 2 as follows:

TABLE II

Strength Results
Modulus of Rupture vs. Fired Bond Content

| Fired Bond Content | (wt %) | Modulus of Rupture (psi) | |
|---|---|---|---|
| | | Standard Bond | New Bond |
| 0.100 | 9.1 | 6070 | 6336 |
| 0.150 | 13.0 | 6813 | 6881 |
| 0.200 | 16.7 | 6737 | 7298 |
| 0.250 | 20.0 | 2776 | 6723 |
| 0.300 | 23.1 | — | 7262 |

Example 2

Abrasive wheels were made for testing and comparing the wear area and the radial wear of the new bond with Norton's standard bonds for seeded sol-gel abrasives. The new bond had the same composition that was used for the new bond in Example 1. The bond was produced by dry blending the raw materials in a Sweco Vibratory Mill for 3 hours. The bond was mixed into an abrasive mix. The abrasive mix consisted of 76.56 wt % of abrasive (consisting of a blend of 50 wt % seeded sol-gel 120 grit filaments, 43.54 wt % 70 grit high purity white fused aluminum oxide, and 6.46 wt % bubbled alumina in a size of finer than 36 mesh), 18.47 wt % bond, 1.38 wt % dextrin, 3.06 wt % liquid animal glue, 0.34 wt % water, and 0.18 wt % ethylene glycol. The mix was molded into 10"×3/16"×0.580"×5.025" wheels with a green density of 2,190 grams/cc. The wheels in the green state were fired at 40° C. per hour from room temperature to 1000° C. held for 8 hours then cooled to room temperature in a periodic kiln.

Abrasive wheels were also made using Norton's standard commercial bond which was produced by dry blending the raw materials in Norton's production facility using standard production processes. The bond was mixed with an abrasive mix. The abrasive mix consisted of 76.27 wt % of abrasive (consisting of a blend of 50 wt % seeded sol-gel 120 grit filaments, 43.54 wt % 70 grit high purity fused white aluminum oxide and 6.46 wt % bubbled alumina in a size finer than 36 mesh), 20.34 wt % bond, 0.92 wt % dextrin, 2.30 wt % of a mixture (mixture consisting of 40 wt % liquid animal glue, 30 wt % powdered malic acid, and 30 wt % water), and 0.18 wt % ethylene glycol. This standard wheel was designed to duplicate the experimental wheel relative to a composition of 81 wt % abrasive and 19 wt % glass. The wheels were fired using a production cycle with a firing soak temperature of 900° C. The abrasive wheels were tested in wet cylindrical plunge grinding on a Bryant Lectraline LL3 I.D./O.D. (10 horsepower) Grinder under conditions outlined in the specification. The results show improved corner holding and are shown in Tables III and IV as follows:

TABLE III

| Radial Infeed (in) | Radial Infeed vs. Wear area (in²) | | | |
|---|---|---|---|---|
| | Wear area (in²) | | | |
| | Standard Bond | | | |
| | #1 | #2 | #3 | New Bond |
| 0.36 | .000062 | .000043 | .000053 | .000038 |
| 0.40 | .000078 | .000066 | .000062 | .000048 |
| 0.44 | .000084 | .000071 | .000067 | .000051 |

TABLE III-continued

| Radial Infeed (in) | Radial Infeed vs. Wear area (in²) | | | |
|---|---|---|---|---|
| | Wear area (in²) | | | |
| | Standard Bond | | | |
| | #1 | #2 | #3 | New Bond |
| 0.48 | .000097 | .000084 | .000080 | .000059 |

TABLE IV

| Radial Infeed (in) | Radial Infeed vs. Radial wear (in) | | | |
|---|---|---|---|---|
| | Radial wear (in) | | | |
| | Standard Bond | | | |
| | #1 | #2 | #3 | New Bond |
| 0.36 | .0024 | .0021 | .0022 | .0014 |
| 0.40 | .0027 | .0024 | .0022 | .0018 |
| 0.44 | .0032 | .0027 | .0022 | .0019 |
| 0.48 | .0034 | .0026 | .0024 | .0020 |

Example 3

Abrasive wheels were made for testing and comparing the wear area and the radial wear of the new bond with Norton's standard bonds for seeded sol-gel abrasives. The new bond had the same composition that was used for the new bond in Example 1. The bond was produced by dry blending the raw materials in a Sweco Vibratory Mill for 3 hours. The bond was mixed into an abrasive mix. The abrasive mix consisted of 83.56 wt % of abrasive (consisting of a blend of 25 wt % seeded sol-gel alumina 70 grit, 25 wt % seeded sol-gel alumina 80 grit, and 50 wt % high purity white fused 70 grit aluminum oxide), 12.47 wt % bond, 0.84 wt % dextrin, 2.97 wt % liquid animal glue, and 0.17 wt % ethylene glycol. The mix was molded into 10- 3/16"×0,580"×5,025" wheels with a green density of 2,341 grams/cc. The wheels in the green state were fired at 40° C. per hour from room temperature to 1000° C. held for 8 hours then cooled to room temperature in a periodic kiln.

Abrasive wheels were also made using Norton's standard commercial bond which was produced by dry blending the raw materials in Norton's production facility using standard production processes. The bond was mixed with an abrasive mix. The abrasive mix consisted of 83.68 wt % of abrasive (consisting of a blend of 25 wt % seeded sol-gel alumina 70 grit, 25 wt % seeded sol-gel alumina 80 grit, and 50 wt % high purity white fused 70 grit aluminum oxide), 13.82 wt % bond, 0.50 wt % dextrin, 1.82 wt % of a mixture (the mixture consisting of 40 wt % liquid animal glue, 30 wt % powdered malic acid and 30 wt % water), and 0.18 wt % ethylene glycol. This mix was then pressed into a wheel (of the same dimension as the wheels above produced with the new bond) and fired using a production cycle with a firing soak temperature of 900° C. This standard wheel was designed to duplicate the experimental wheel relative to a composition of 87.4 wt % abrasive and 12.6 wt % glass bond. The abrasive wheels were tested in wet cylindrical plunge grinding on a Bryant Lectraline LL3 I.D./O.D. (10 horsepower) Grinder under conditions outlined in the specification. The results are show improved corner holding and are shown in Tables V and VI as follows:

TABLE V

Radial Infeed vs. Wear area (in²)

| Radial Infeed (in) | Wear area (in²) | | |
|---|---|---|---|
| | Standard Bond | | |
| | #4 | #5 | New Bond |
| 0.20 | — | .000066 | — |
| 0.24 | .000049 | .000080 | — |
| 0.28 | .000064 | .000084 | — |
| 0.32 | .000069 | — | — |
| 0.36 | .000074 | .000100 | .000045 |
| 0.40 | .000084 | .000130 | .000054 |
| 0.44 | .000099 | .000140 | .000075 |
| 0.48 | .000100 | .000170 | .000100 |

TABLE VI

Radial Infeed vs. Radial wear (in)

| Radial Infeed (in) | Radial wear (in) | | |
|---|---|---|---|
| | Standard Bond | | |
| | #4 | #5 | New Bond |
| 0.20 | — | .0025 | — |
| 0.24 | .0018 | .0031 | — |
| 0.28 | .0019 | .0037 | — |
| 0.32 | .0025 | — | — |
| 0.36 | .0024 | .0036 | .0015 |
| 0.40 | .0029 | .0044 | .0021 |
| 0.44 | .0027 | .0043 | .0022 |
| 0.48 | .0034 | .0048 | .0027 |

Example 4

Fused aluminum oxide abrasive wheels were made for testing under commercial operation conditions to compare the new bond with Norton's standard bond for production form holding applications. The new bond was the same composition as Example 1, except that it did not contain cobalt aluminate spinel ceramic pigment, (i.e, the bond was a clear glass). The bond was produced by dry blending the raw materials in Norton's production facility using standard production processes. The abrasive mix consisted of 85.8 wt. % of 100 grit abrasive (consisting of a blend of 50% commercial brown fused $Al_2O_3$ and 50% fused white $Al_2O_3$), 10.5 wt. % bond, 1.41 wt. % dextrin, 1.70 wt. % liquid animal glue, 0.47 wt. % water and 0.13 wt. % ethylene glycol. The mix was molded into 20-¼ ×1×11-¾" wheels with a green density of 2.182 g/cm³. The wheels were fired from room temperature at 20° C. per hour to 1000° C., held for 8 hours, then cooled to room temperature in a periodic kiln.

Abrasive wheels were also made using Norton's standard commercial bond which was produced by dry blending the raw materials in Norton's production facility using standard production processes. The bond was mixed with an abrasive mix. The abrasive mix consisted of 85.5 wt. % of the same 100 grit abrasive that was used in the new bond wheel, 10.83 wt. % bond, 1.84 wt. % dextrin, 1.73 wt. % water and 0.09 wt. % ethylene glycol. The standard wheel contained slightly more fired bond glass (11.15 wt. %) than the experimental wheel (10.46 wt. %).

The wheels were fired using a production cycle with a firing soak temperature of 1225° C.

The abrasive wheels were tested in wet O.D. cylindrical grinding of internal bearing races on a commercial race grinder. The races were made of 52100 bearing steel hardened to Rc 58-60.

Grinding depth of cut was 0.005" in roughing and 0.002" finishing for each race. Grinding conditions included wheel speed of 12,000 sfpm, commercial synthetic oil coolant at 5% concentration with water and a commercial reverse plated 60/80 mesh diamond roll dresser. Results to produce parts within dimensional and surface finish (4 to 6 RMS) tolerances were:

TABLE VII

| Bond | Dressing Depth or Compensation | Parts per Dress Cycle |
|---|---|---|
| Standard | .002" | 10 |
| Experimental | .001" | 30 |

Thus, cutting the dress compensation by one-half and tripling the number of parts per dress interval resulted in a six-fold (i.e., doubled wheel life×tripled parts per dress interval) performance improvement for the experimental bond when used with alumina abrasive.

Example 5

Abrasive wheels were made for testing and comparing the wear area and the radial wear of the new bond with Norton's standard bonds for seeded sol-gel abrasives. The new bond had the same composition that was used for the new bond in Example 1. The bond was produced by dry blending the raw materials in Norton's commercial production bond blending facility. The bond was mixed into an abrasive mix. The abrasive mix consisted of 83.53 wt % of abrasive (consisting of a blend of 75 wt. % 70 grit and 25 wt. % 80 grit high purity single crystal fused aluminum oxide), 12.61 wt % bond, 0.84 wt % dextrin, 2.25 wt % liquid animal glue, 0.65 wt % water, and 0.13 wt % ethylene glycol. The mix was molded into 10"- 3/16"×0.580"×5.025" wheels with a green density of 2.333 grams/cc. The wheels in the green state were fired at 40° C. per hour from room temperature to 1000° C. held for 8 hours then cooled to room temperature in a periodic kiln.

Abrasive wheels were also made using Norton's standard commercial bond which was produced by dry blending the raw materials in Norton's production facility using standard production processes. The bond was mixed with an abrasive mix. The abrasive mix consisted of 87.05 wt % of abrasive (consisting of a blend of 50% 70 grit and 50 wt % of 80 grit high purity fused single crystal aluminum oxide), 14.28 wt % bond, 0.52 wt % dextrin, 1.71 wt % of a mixture (mixture consisting of 40 wt % liquid animal glue, 30 wt % powdered malic acid, and 30 wt % water). The mix was molded into 10- 3/16" ×0.580"×5.025" wheels with a green density of 2.323 grams/cc. This standard wheel was designed to duplicate the experimental wheel relative to a composition of 87.5 wt % abrasive and 12.5 wt % glass. The wheels were fired using a production cycle with a firing soak temperature of 900° C. The abrasive wheels were tested in wet cylindrical plunge grinding on a Bryant Lectraline LL3 I.D./O.D. (10 horsepower) Grinder under conditions outlined in the specification. The results show improved corner holding and are shown in Tables VIII and IX as follows:

TABLE VIII

Radial Infeed vs. Wear area (in$^2$)

| Radial Infeed (in) | Wear area (in$^2$) | |
|---|---|---|
| | Standard Bond | New Bond |
| 0.12 | .000063 | .000033 |
| 0.16 | .000084 | — |
| 0.20 | .000088 | .000047 |
| 0.24 | .000089 | .000054 |
| 0.28 | .000110 | .000088 |
| 0.32 | .000115 | .000090 |

TABLE IX

Radial Infeed vs. Radial wear (in)

| Radial Infeed (in) | Radial wear (in) | |
|---|---|---|
| | Standard Bond | New Bond |
| 0.12 | .0020 | .0012 |
| 0.16 | .0027 | — |
| 0.20 | .0032 | .0020 |
| 0.24 | .0030 | .0024 |
| 0.28 | .0036 | .0027 |
| 0.32 | .0038 | .0033 |

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. An abrasive grinding wheel comprising alumina abrasive and a vitreous bond wherein the vitreous bond after firing comprises greater than 47 weight % $SiO_2$, less than about 16 weight % $Al_2O_3$, from about 0.05 to about 2.5 weight % $K_2O$, from about 7 to about 11% $Na_2O$, from about 2.0 to about 10.0 weight % $Li_2O$ and from about 9 to about 16 weight % $B_2O_3$, and wherein the abrasive grinding wheel is substantially free of sol gel alumina abrasive.

2. The wheel in claim 1, wherein the alumina is a fused alumina oxide.

3. The wheel in claim 2, wherein the alumina is a mixture of brown fused aluminum oxide and white fused aluminum oxide.

4. The wheel in claim 2, wherein the wheel comprises about 34 to 56 volume percent alumina abrasive.

5. The wheel in claim 1, wherein the abrasive grinding wheel contains from about 3 to about 25 volume % of vitreous bond.

6. The wheel in claim 1, wherein the vitreous bond after firing comprises from about 52 to about 62 weight % $SiO_2$, and from about 12 to about 16 weight % $Al_2O_3$.

* * * * *